United States Patent [19]
Galand et al.

[11] Patent Number: 5,631,978
[45] Date of Patent: May 20, 1997

[54] METHOD AND APPARATUS FOR SUBBAND CODING IMAGES

[75] Inventors: Claude Galand, Cagnes sur Mer; Gilbert Furlan, Roquebrune Cap Martin; Emmanuel Lancon, Nice; Jean Menez, Cagnes sur Mer, all of France

[73] Assignee: International Business Machines Corporation, Armonk, N.Y.

[21] Appl. No.: 880,921

[22] Filed: May 11, 1992

[30] Foreign Application Priority Data

Jul. 11, 1991 [EP] European Pat. Off. ............... 91480104

[51] Int. Cl.⁶ .................................. G06K 9/36; H04N 7/12
[52] U.S. Cl. ..................... 382/240; 348/398; 382/260
[58] Field of Search ............................. 382/56, 49, 232, 382/240, 244, 235, 263, 264, 260, 46; 348/398

[56] References Cited

U.S. PATENT DOCUMENTS

| | | |
|---|---|---|
| 4,268,861 | 5/1981 | Schreiber et al. |
| 4,464,782 | 8/1984 | Beraud et al. ............... 381/31 |
| 4,479,213 | 10/1984 | Galand et al. ............. 370/118 |
| 4,652,856 | 3/1987 | Mohiuddin et al. |

FOREIGN PATENT DOCUMENTS

| | | | |
|---|---|---|---|
| 2103401 | 2/1983 | European Pat. Off. ......... G06F 7/50 |
| 0176243 | 4/1986 | European Pat. Off. ......... H04B 1/66 |
| 0413570 | 2/1991 | European Pat. Off. ......... H04N 7/13 |

OTHER PUBLICATIONS

Drygajlo, A., "Butterfly Filter Banks", IEEE, 1989, pp. 594–598.

IEEE Transactions on Acoustics, Speech and Signal Processing, vol. 34, No. 5, Oct. 30, 1986, New York, pp. 1278–1288, "Subband Coding of Images" by J. W. Woods and S. D. O'Neal.

ICASSP 88, vol. 2, Apr. 11, 1988, New York, pp. 1100–1103, "Three Dimensional Sub-Band Coding of Video" by G. Karlsson and M. Vetterli.

Patent Abstracts of Japan, vol. 12, No. 88 (P–678) Mar. 23, 1988 and JP–A–62 221 076 (Toshiba) Sep. 29, 1987.

IBM Technical Disclosure Bulletin, vol. 25, No. 5, Oct. 30, 1982, "Adaptive Context Generation for Data Compression" by J. Rissanen.

*Primary Examiner*—Jose L. Couso
*Assistant Examiner*—Matthew C. Bella
*Attorney, Agent, or Firm*—John J. Timar; Edward H. Duffield

[57] ABSTRACT

This technique for coding images involves filtering the original input image into subband images using successive high-pass and low-pass filterings over a tree-shaped filter with each tree filtering stage involving re-scaling operations adjusted to keep the subband image signal dynamics substantially stable throughout the filtering tree.

5 Claims, 15 Drawing Sheets

Decomposition step

METHOD AND APPARATUS FOR SUBBAND CODING IMAGES

TECHNICAL BACKGROUND

The invention deals with methods for efficiently coding images, and is more particularly directed to a method for performing said coding using Sub Band Coding (SBC) techniques, and a device for implementing said method.

Many recent efforts in communication technology are directed towards developing multimedia digital networks wherein voice, images and data may be transmitted together, using common facilities. This may be achieved using convenient and efficient digital coding techniques.

Therefore, efficient methods for digitally coding image signals are obviously of increasing interest in a world wherein communication is a key item.

One of the basic problems to be solved lies in the tremendous flow of bits generated through the coding of images or video signals. Methods have been proposed for "compressing" such bit flows without impairing the image quality obtained upon decoding of the coded image. But cost efficiency is also a key item, and improved methods for achieving efficient coding at reasonable cost are of particular interest. This goal may be achieved by reducing the image signal processing complexity.

PRIOR ART

Sub Band Coding (SBC) is a powerful coding technique that presents some interesting properties such as continuous frequency analysis and its ability to be used in progressive and multi-rate schemes.

First applied to speech compression (see "32 KBps CCITT Compatible Split Band Coding Scheme" published by D. Esteban and C. Galand in 1978 IEEE International Conference on Acoustics, Speech and Signal Processing, held at Tulsa, Okla., Apr. 10–12, 1978), Sub Band Coding (SBC) is now quite a popular technique for image compression (see "Subband Coding of Images" by John W. Woods, in IEEE Transactions on Acoustics, Speech and Signal Processing, Vol. ASSP-34, No. 5, October 1986).

SBC includes splitting up the frequency bandwidth of the original signal into sub-sampled subband signals that are subsequently separately quantized and encoded.

Several methods have been proposed for encoding each subband signal, but these are sub-optimal in terms of efficiency.

OBJECTS OF INVENTION

One object of the invention is to provide an improved and efficient method for coding image signals, based on SBC coding techniques.

Another object of the invention is to provide an improved image subband coding method whereby individual subband signals are conveniently processed prior to being submitted to quantizing, to enable reducing the number of required quantizing levels while keeping a visually loss less coding scheme.

SUMMARY OF INVENTION

Briefly stated, processing complexity and cost efficiency are achieved through submitting the individual subband signals to convenient scaling operations prior to performing subband quantizing operations.

This and other objects, characteristics, and advantages of the invention will be more readily apparent when described with reference to attached figures of a preferred embodiment.

DETAILED DESCRIPTION OF THE PREFERRED EMBODIMENT

Figure 1:
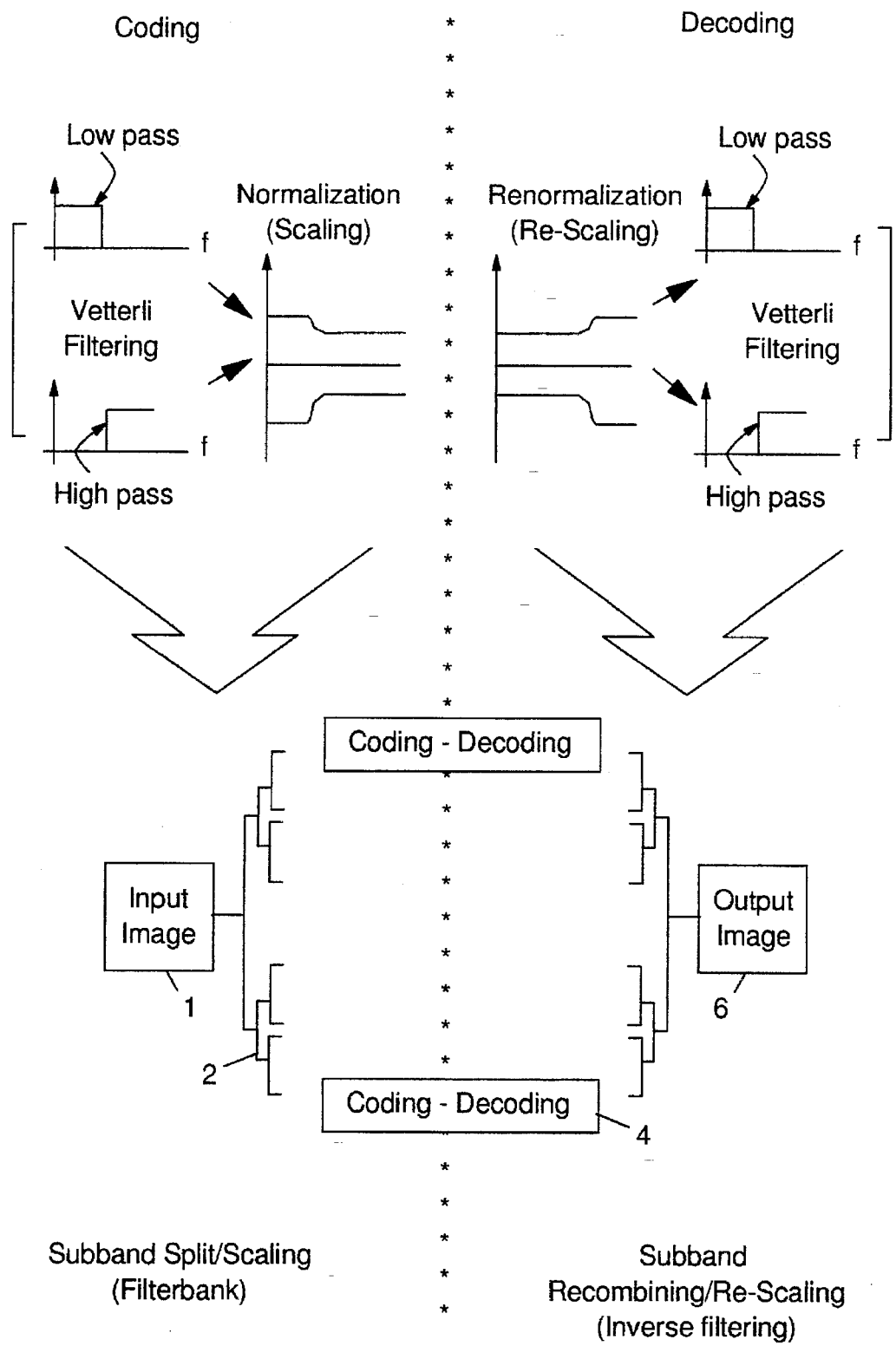
FIG. 1 is a simplified functional representation of the overall coding/decoding.

Represented in FIG. 1 is a simplified functional representation of the overall structure of the subband coding/decoding scheme of this invention.

Each input image frame 1 is first split into several frequency subbands through a tree structured filter bank 2 involving special scaling. Each subband signal is then quantized/coded separately. Various types of coders could be used for each subband signal. However, in a preferred embodiment, FIG. 1 shows use of entropy coding by context algorithm 4. Decoding or signal synthesis would require inverse quantizing and proper decoding 4 whereby the individual subband signals would be regenerated. This would be followed by inverse filtering operations, recombining the individual subband signals into the reconstructed original image frame 6.

Assume the original signal obtained by scanning the input image 1 is a two-dimensional array of pixels each coded with 8 bits (value between zero and 255) arranged into X columns and Y rows (or lines). Filtering and scaling are performed as follows, for the subband splitting.

Each low-pass filtered component Lp(i,j) is computed for subband splitting, for instance:

$$Lp(i,j) = \left( \left( \sum_{K=0}^{m} \text{CoefL}(k) * \text{Image}(i,j-k) \right) + \text{ShiftL} \right) / \text{NormL} \quad (1)$$

Wherein:

i and j are, respectively, row and column indexes.

CoefL are low-pass filter coefficients m+1 is the number of filter coefficients

Image(i,j) is the value of the (i,j) located image sample (pixel)

ShiftL is a so-called low-pass scaling factor operating a shifting operation

NormL is a so-called low-pass scaling factor operating a level normalizing operation;

and * stands for the multiplication symbol.

In a preferred embodiment, the following values have been selected:

m=4

ShiftL=512

NormL=12

CoefL (0,1, . . . ,4)=−1, 2, 6, 2, −1

High-pass components Hp(i,j) are similarly computed according to the following expressions:

$$Hp(i,j) = \left( \left( \sum_{K=0}^{n} \text{CoefH}(k) * \text{Image}(i,j-k) \right) + \text{ShiftH} \right) / \text{NormH} \quad (2)$$

Wherein:
 CoefH are high-pass filter coefficients
 n+1 is the number of filter coefficients
 Image(i,j) is the pixel at location (i,j)
 ShiftH is a scaling factor operating a shift operation on high-pass filtered signal components
 NormH is a scaling factor operating a normalizing operation on high-pass filtered signal components.

In a preferred embodiment:
 n=2
 ShiftH=512
 NormH=4
 CoefH(0,1,2)=1, −2, 1

For a more detailed filter coefficient definition, one may refer to the Karlsson and Vetterli article in Proceeding of IEEE Int. Conf. ASSP New-York, April 1988, pp 1100–1103 ("Three dimensional sub-band coding of video").

In summary, one may notice that the image signal is here not only split into subband signals, using a tree structured bank of filters (with convenient sub-sampling to keep the overall sampling rate even), but in addition, each sub-band signal is conveniently scaled throughout the tree. Said scaling includes a pre-defined shifting operation and a level normalizing operation applied to each filtered component being computed. Different shifting and level normalizing coefficients may be defined for low-pass and high-pass filtering. On the other hand, correlative re-scaling and re-normalizing operations will need to be applied during inverse filtering while decoding the coded and compressed image.

The so-called scaling is based on the dynamic (or signal swing) of the resulting subband signals. It is made to permanently bring said dynamic back to its original limits or, in other words, keep the signal swing substantially constant throughout the filter tree. It should, therefore, depend on the filter characteristics. Let's assume the original signal is coded with 8 bits varying from zero to 255. Now, for example, consider the above mentioned high-pass filter (equation 2). The coefficients are 1, −2 and 1. The two limit sequences of pixels to be filtered could be (255, 0, 255) and (0, 255, 0). The corresponding high-pass filtered pixels would then be:

1*255−2*0+1*255=510 and

1*0−2*255+1*0=−510

The corresponding dynamic of the output signal would thus be (−510, +510), while the filter input signal dynamic was (0, 255). In general, the filters are normalized to keep input/output filter energies even. This kind of normalization would lead to clipping and therefore to a non-linear quantizing of the input signal. In this application, re-scaling will instead bring the dynamic (−510, +510) back to convenient values by first shift the output signal, up to the limits (0, 1020) through a +510 shift and then limit the upper value through a normalizing operation of division by 3.9842. In practice, to enable a simpler implementation ShiftH is made equal to +512 and NormH equal to 4 (simple division through a 2-bit shift).

Same kind of rationale is applied to all other required filters, i.e. Low-pass filters, etc.

However, this technique may shrink the signal dynamic whenever the limit pixel sequences do not occur frequently. Karlsson-Vetterli filters have been selected for being less-sensitive to said dynamics shrinking.

Another advantage of the scaling derives from the fact that by lowering the signal dynamics, one reduces the signal entropy and this boosts the interest for so-called entropy coding. The resulting bandwidths signals (pixels) could be quantized/coded using any entropy coding. Entropy coding using so-called context based coding (see IBM Technical Disclosure Bulletin, Vol. 25, No. 5, October 1982, P. 2462–2464 "Adaptive Context Generation for Data Compression" by J. Rissanen) has been preferred for various reasons. For instance, since context coding is history dependent, i.e. coding of a current pixel is dependent on past pixels, context coding algorithm may be adjusted to each type of subband. For instance, a distinction shall be made between so-called vertical and horizontal filterings (as will be explained hereunder), and the various subband typical correlations applied will be different from each other. The subbands may then be split into two groups: one including the subbands with vertical correlations, and the other including the subbands with horizontal correlations. Each group will be given a different reordering function in the context encoding.

Figure 2A:
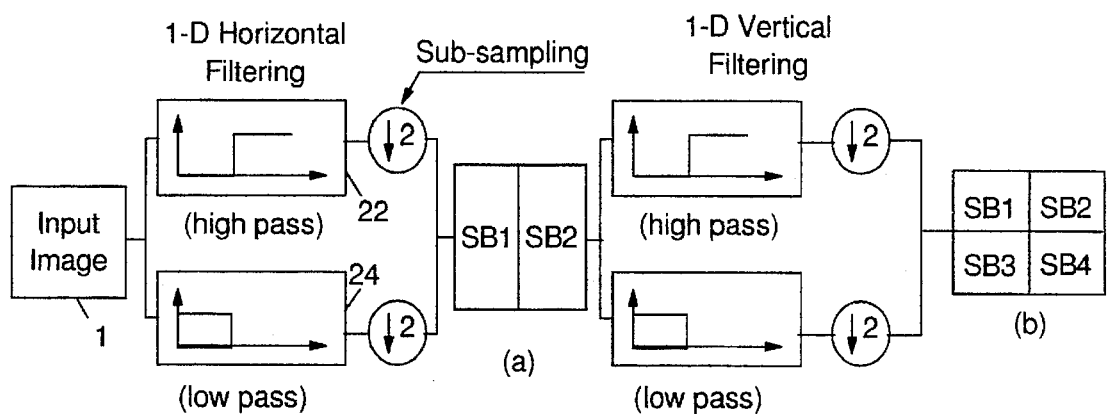
FIGS. 2–4 are functional representations of subband decomposition.
Figure 2B:
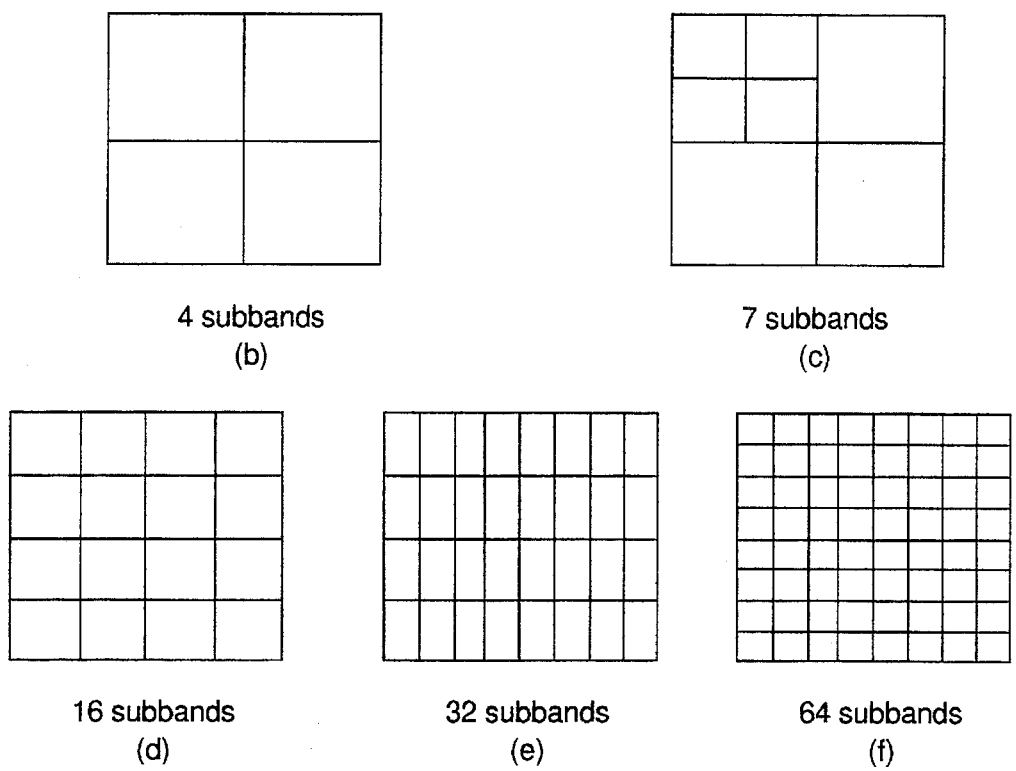

A more detailed description of the filtering operations, explaining the vertical and horizontal considerations, is represented in the block diagram of FIG. 2. Let's assume first that the original image is scanned. The resulting signal is filtered through both a high-pass filter 22 and a low-pass filter 24. Each filtered signal is sub-sampled by dropping one out of two samples of each filter output to keep even the overall amount of information throughout the filtering. The low-pass filtered signal is stored in a storage location SB1(a), while the high-pass filtered signal is stored in SB2(a). One has now two subband images SB1(a) and SB2(a), herein referred to as sub-images SB1(a) and SB2(a). At next stage of the tree structured filter bank, the two sub-images SB1(a) and SB2(a) are each split into two subbands, one low-frequency band and one high-frequency band. The sub-image SB1(a) is split into two new sub-images, a low-pass filtered sub-image stored into SB1(b) and a high-pass filtered sub-image stored into SB3(b). Same operations applied to SB2(a) lead to a low-pass filtered sub-image SB2(b) and a high-pass filtered sub-image SB4(b). Accordingly, the resulting frame (b) is a four subband frame, as represented in FIG. 2B. The tree structured filtering may go on and lead to 7 subbands 2B(c), or 16, 32, 64, etc. . . . subbands, respectively referred to in FIG. 2B(c), (d), (e) or (f).

Figure 3:
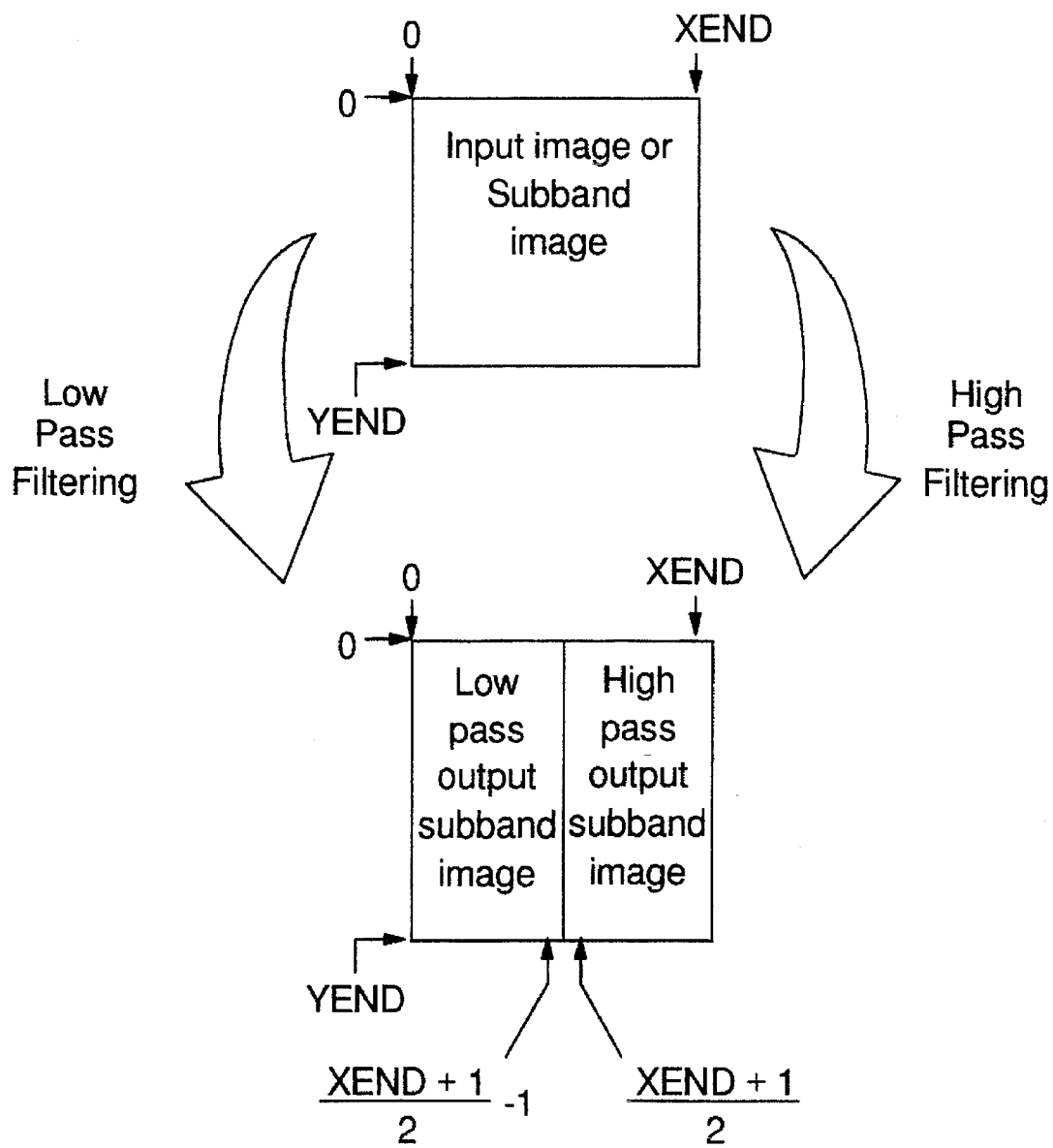

Represented in FIG. 3 is an illustration of the indexing operation for an input or a subband image having columns (j) varying from index zero to Xend and rows (i) varying from index zero to Yend. This image frame is horizontally filtered into two subbands (one low-frequency subband and one high-frequency subband).

The low-pass output subband image (or sub-image) indexes vary from columns zero to $$\frac{(\text{Xend}+1)}{2} - 1),$$

and rows zero to Yend.

The high-pass output subband image indexes vary from columns $$\frac{\text{Xend}+1}{2} \text{ to Xend,}$$

and rows zero to Yend.

Figure 4:
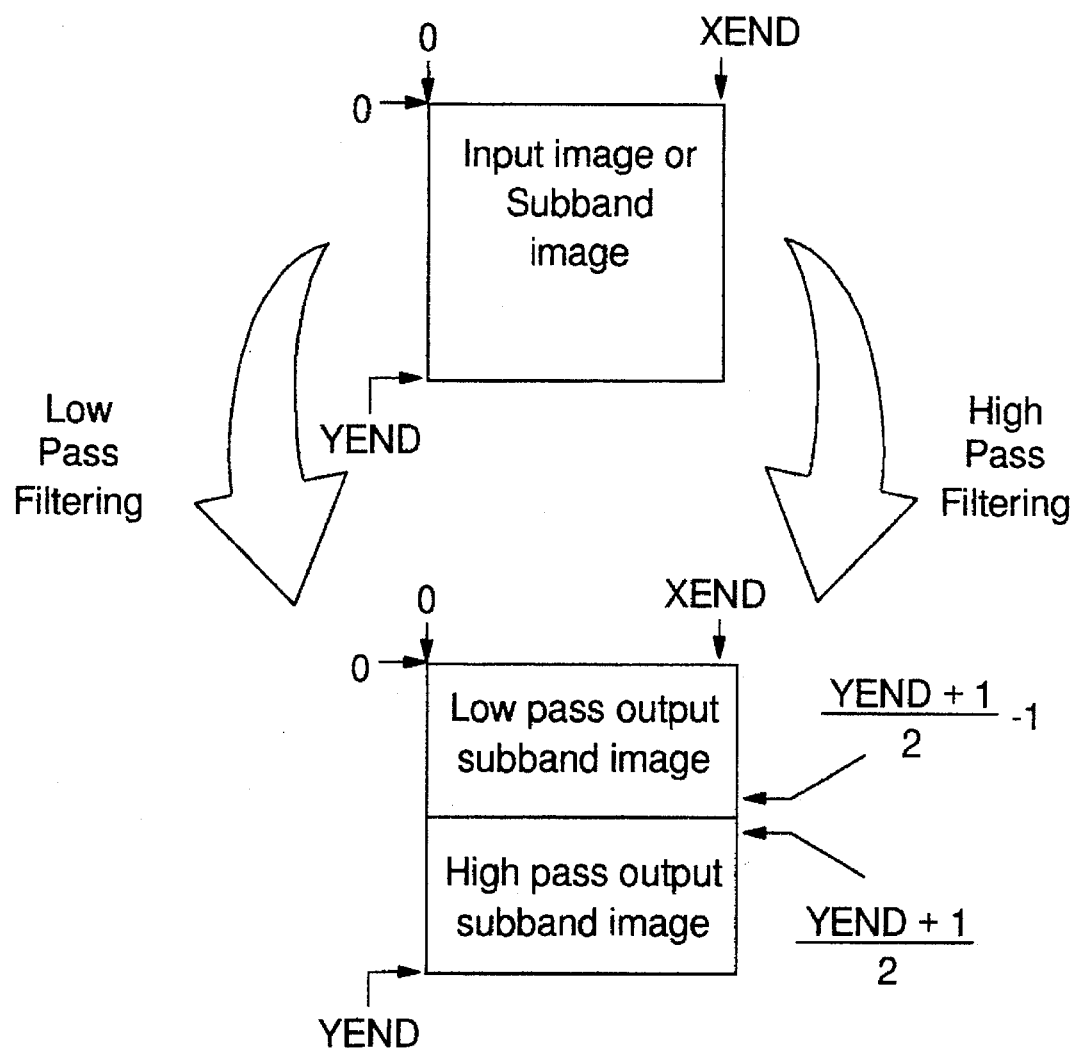

A similar approach is used for vertical filtering decompositions as represented in FIG. 4. Low-pass output subband image indexes are (zero to Xend) and $$(\text{zero to } \frac{\text{Yend}+1}{2} - 1).$$

The high-pass output subband image indexes are (zero to Xend) and $$(\frac{\text{Yend}+1}{2} \text{ to Yend}).$$

Represented in the flow-charts are the detailed operations for performing the required filtering and scaling mentioned above.

Given those flowcharts, a man skilled in the art will have no trouble implementing those operations into a program or microcode without undue effort.

One should notice that, just for convenience, the parameters and variables in the flow-chart have been written with capital letters and i,j converted into coordinates X, Y, as compared with equations (1) and (2). For instance:

| CoefL(k)  | gives | COEFL(Z)    |
|-----------|-------|-------------|
| Image(i,j)| gives | IMAGE(Y, X) |
| and so on...|     |             |

Also: Lp(i,j) or Hp(i,j) are made VAR and iteratively computed.

Figure 5:
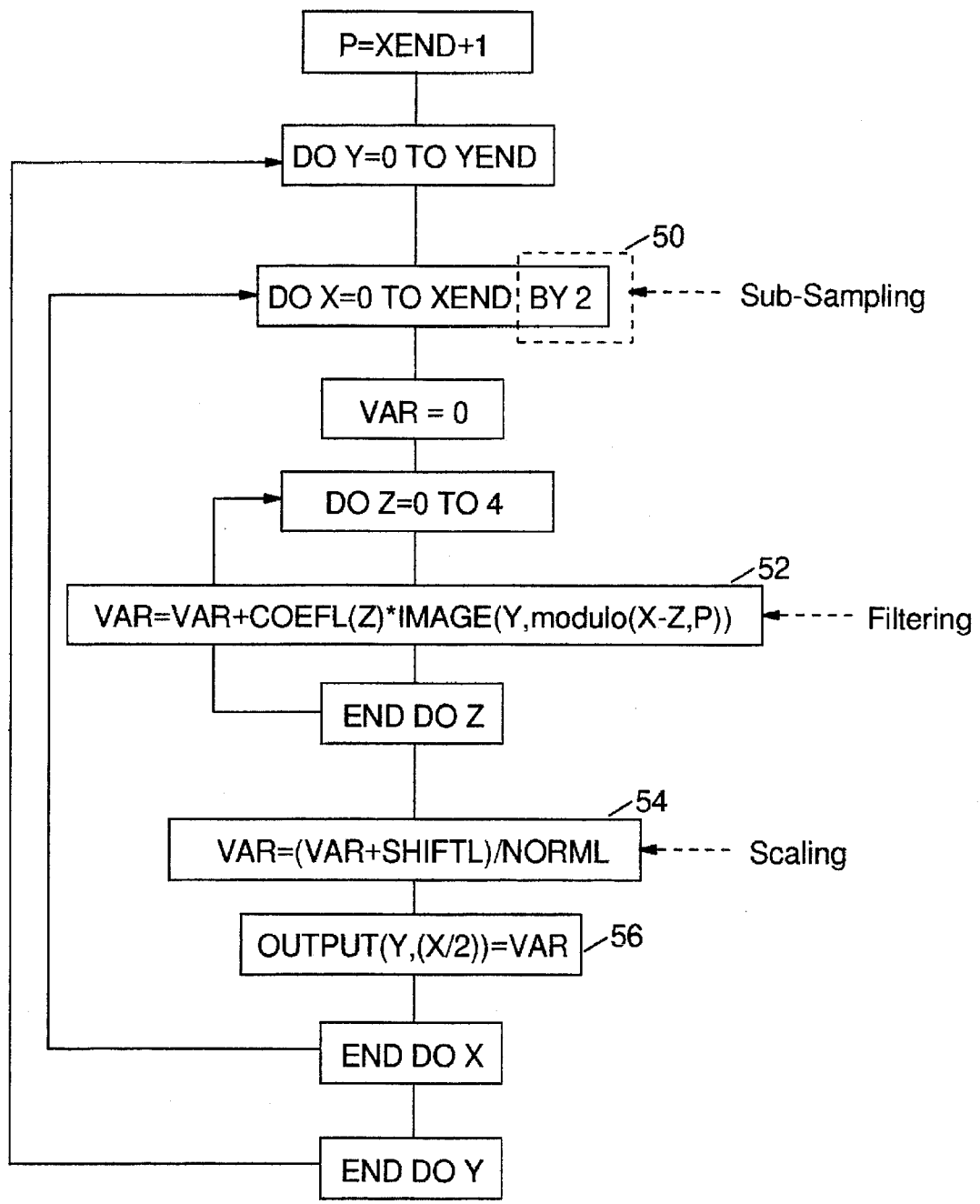
FIGS. 5–8 are flow-charts for performing the filtering and scaling functions used in the invention.

Represented in FIG. 5 is a flow-chart for implementing the low-pass horizontal filtering operations, together with the sub-sampling and scaling as required (tree structured filter bank 2, for decomposition of the signal in view of further encoding).

First variable Y is made to vary from zero to Yend, with a 1-step increment, while X varies from zero to Xend, with a 2-steps increment (to achieve the required sub-sampling). The variable VAR used to represent the filtered output sample is first set to zero. The filtering operation representing first part of equation (1) above is first achieved through operations (step 52), and completed with the required scaling operations including addition of shiftL and division by NormL (step 54). Since m was set equal to 4 in equation (1), then an accumulating parameter Z is made to vary from zero to 4. The output sample Lp(i,j) is obtained in final step (step 56), with the corresponding output frame location. This operation, once repeated over any image samples (pixels) leads to generating a sub-image such as SB1(a), for instance. For the filtering, the first pixels of the output image, the delay line of the filter is initialized with the last pixels of the image. This guarantees that the average value is the same in practice. This operation is simply implemented through a modulo addressing. The modulo is equal to the number of pixels. For example, if XEND=255, the modulo P is equal to 256, and the notation modulo (X−Z, P) means take (X−Z) modulo P.

Figure 6:
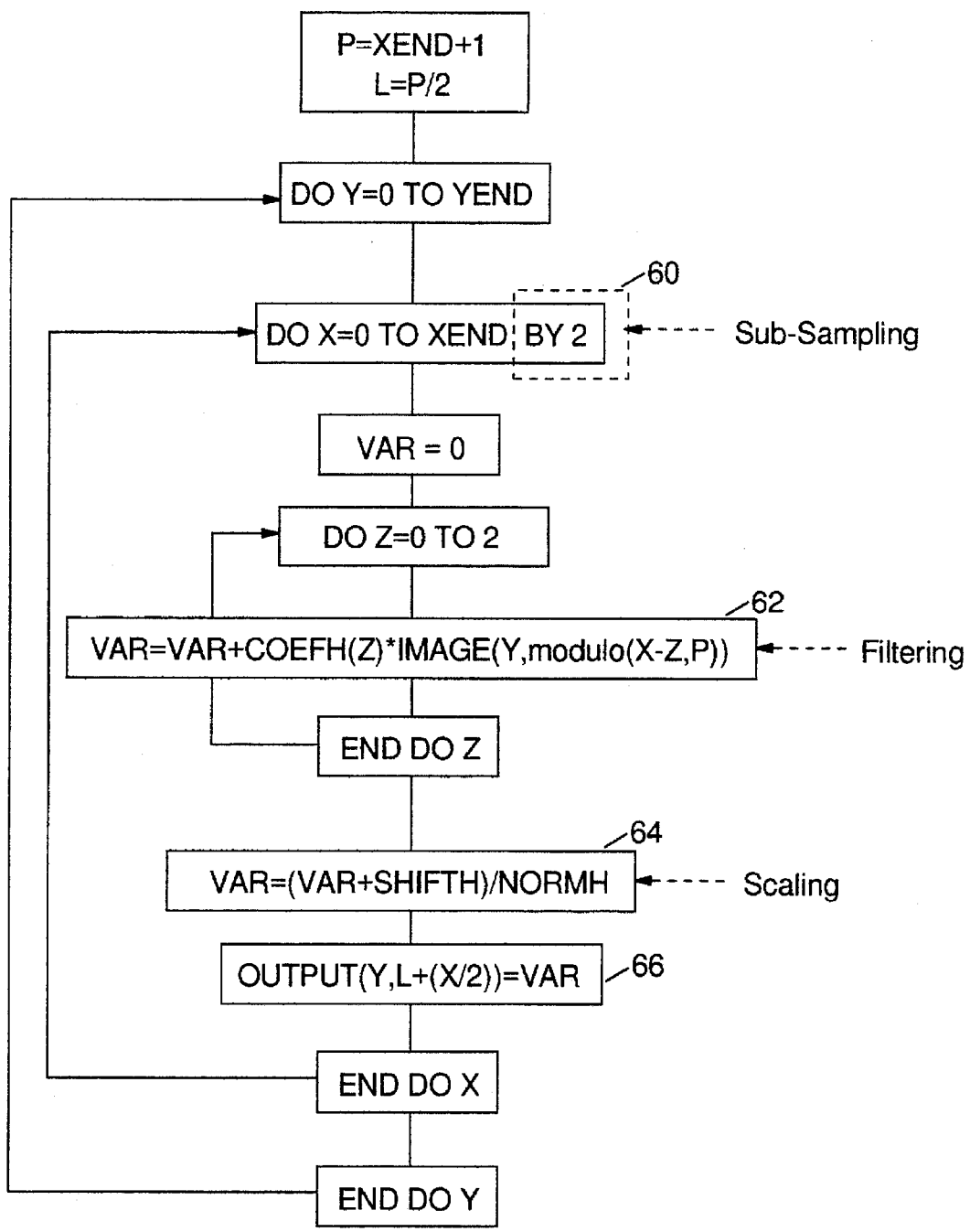

Similarly, represented in FIG. 6 is a flowchart for implementing the high-pass horizontal filtering of the filter bank 2 (Decomposition).

Parameters P and L are set to Xend+1 and $$\frac{\text{Xend}+1}{2}$$

respectively.

Variable Y is made to vary from zero to Yend, and X from zero to Xend. X varies by increments of 2 to achieve the required down sampling. The output sample parameter VAR is cleared to zero and a variable filter coefficient parameter Z is made to vary from zero to two (to enable using the 3 filter coefficients).

The output filter sample is computed through accumulation (step 62), and then scaling is operated (step 64). Finally, the output sample is positioned (step 66). The two subband images SB1(a) and SB2(a) have thus been generated. One may then start achieving the operations of the second stage of filter bank 2 by processing low-pass filtering of both SB1(a) and SB2(a) and high-pass filtering of same, to finally get the subband filtered images (SB1(b), SB2(b), SB3(b), SB4(b)), based on the flow-charts of FIGS. 7 and 8.

Figure 7:
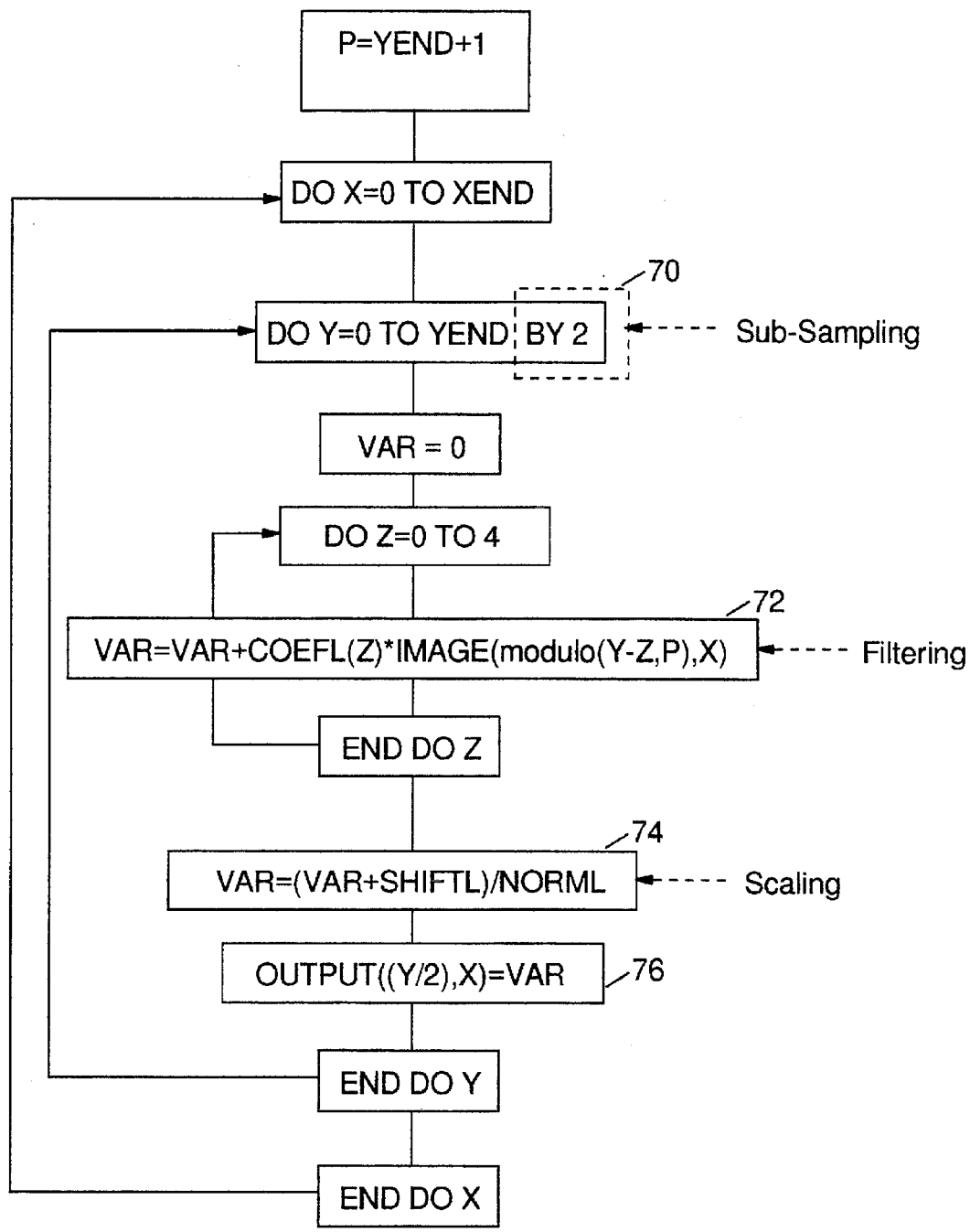

FIG. 7 represents a flow-chart for implementing the low-pass vertical filtering 4 (Decomposition) with combined sub-sampling and scaling function. Parameter P is set to Yend+1. Variable X is made to vary from zero to Xend by unitary steps while Y is made to vary from zero to Yend by steps of 2 (see step 70 of FIG. 7), to achieve the sub-sampling operations. A variable VAR used for storing the computed filter output samples is set to zero, and a variable Z is made to vary from zero to four. So-called vertical filtering (see FIGS. 7 and 8) thus differ from horizontal filtering (see FIGS. 5 and 6) in that Y is now being incremented by 2 while X is incremented by 1 throughout the process, instead of X incremented by 2 and Y by 1, as was the case for horizontal filtering, or more generally speaking by inverting the X and Y variables consideration.

Apart from the above differences the process for achieving low-pass filtering looks similar in both FIGS. 7 and 5 (see steps 70, 72, 74 and 76, as compared to 50, 52, 54 and 56).

Figure 8:
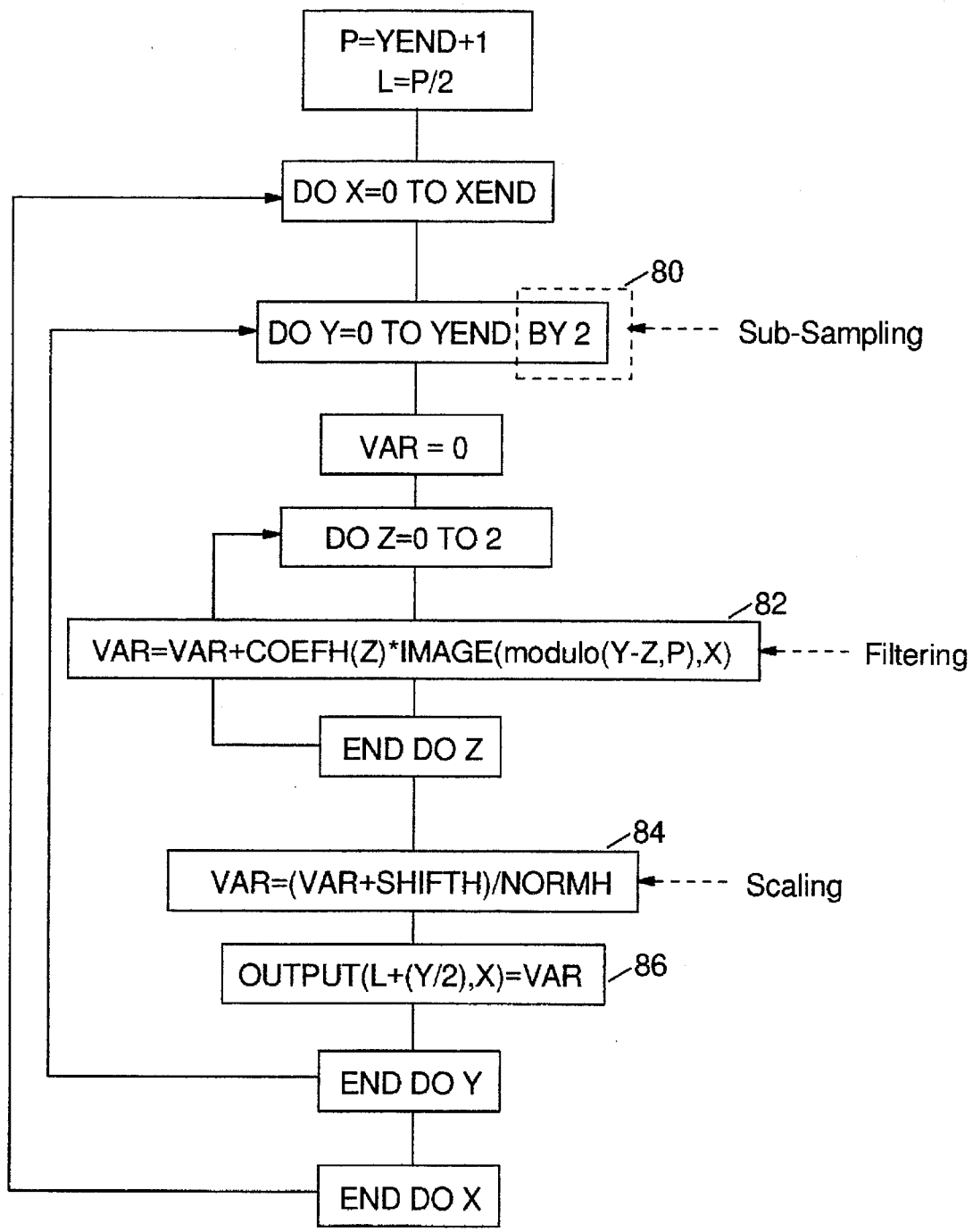

Similar remarks do apply to high-pass vertical filtering, as represented in FIG. 8. No additional explanations are required and one may just compare steps 60, 62, 64 and 66 in FIG. 6, with steps 80, 82, 84 and 86 in FIG. 8.

As represented in FIG. 1, once subband decomposition with proper re-scaling is achieved, each subband image must be quantized/encoded. Several quantizing approaches may be selected. For the best embodiment described herein, a so-called entropy coding based on context algorithm has been selected.

Context based coding is an efficient method for coding a string or flow of symbols such as, for instance, a flow of pixels (or symbols) $x_1, x_2, \ldots, x_t$ sequentially detected while scanning a given image. For details on such a method and devices for implementing said method, one may refer to U.S. Pat. No. 4,652,856, to the above referenced IBM Technical Disclosure Bulletin, and to co-pending European application No. 90480158.6: "Improved data compression/coding method and device for implementing said method", herein incorporated by reference.

As represented in FIG. 1 of the above mentioned U.S. patent, a context based coder includes a Modelling Unit feeding an encoding unit. The Encoding Unit is designed based on the so-called arithmetic coding techniques.

The Modelling Unit is fed with the flow of symbols (or pixels) $x(t)=x_1, x_2, \ldots, x_t$ ($x_t$ being the current symbol fed into the Modelling Unit, while $x_1, x_2, \ldots$ are past sequentially incoming symbols.

However, efficient modelling is a critical feature within the overall subband image coding process. To achieve such modelling, the so-called "context" dependent method has been proposed by J. Rissanen in the IBM Technical Disclosure Bulletin Vol. 25 No. 5 October 1982, pp. 2462–2464. To that end, the coding of any current symbol $x_t$ takes into consideration both past symbols within the considered string, and a so called "influence", or rather relative influence, of past symbols over current symbol coding. The context is defined according to a reordering of past symbols thought to have "influence" on current symbol, with the most influential symbol considered first, then considering the next to most influential, and so on.

Rissanen's method collects in a "tree" the number of times or "counts" each symbol of the string being processed occurs at various contexts or states. Modelling operations involve growing the tree in correlation with the consecutive symbols occurrences within the string by assigning each tree "node" with count facilities, taking also into consideration the mentioned influence criteria.

The Rissanen method has been further improved in the above mentioned co-pending application, to enable reducing the required modelling storage to a level which depends upon the properties of the string but not on the string length. It also reduces drastically the complexity and allows a non-binary implementation, while increasing the performances of the system.

This is accomplished based on the concept of stochastic complexity and its use to determine the optimal tree for each symbol in the string. Stochastic complexity generalizes Shannon's data complexity which is defined as the negative logarithm of a probability distribution "p" evaluated at the considered data string.

The generalization consists in adding to Shannon's information, a term reflecting the complexity of the task required to estimate the distribution needed in the Shannon information.

Using this method, one can, in the context tree, select that node as the optimal context which gives the smallest expected coding length to the next (i.e. currently considered) symbol.

Said co-pending application modifies Rissanen's method by providing so called Relative Efficiency Counter (REC) facilities and more importantly, by embedding said counter facilities in the tree growing algorithm and by considering REC variations while updating and growing the tree, whereby a storage limiting improvement is achieved.

Once the above "Modelling" operations are performed, the required data to be fed into an arithmetic coder (see Encoding Unit in cited U.S. patent) are available. They are fed into said Encoding Unit, to provide the finally coded subband signal.

Figure 9:
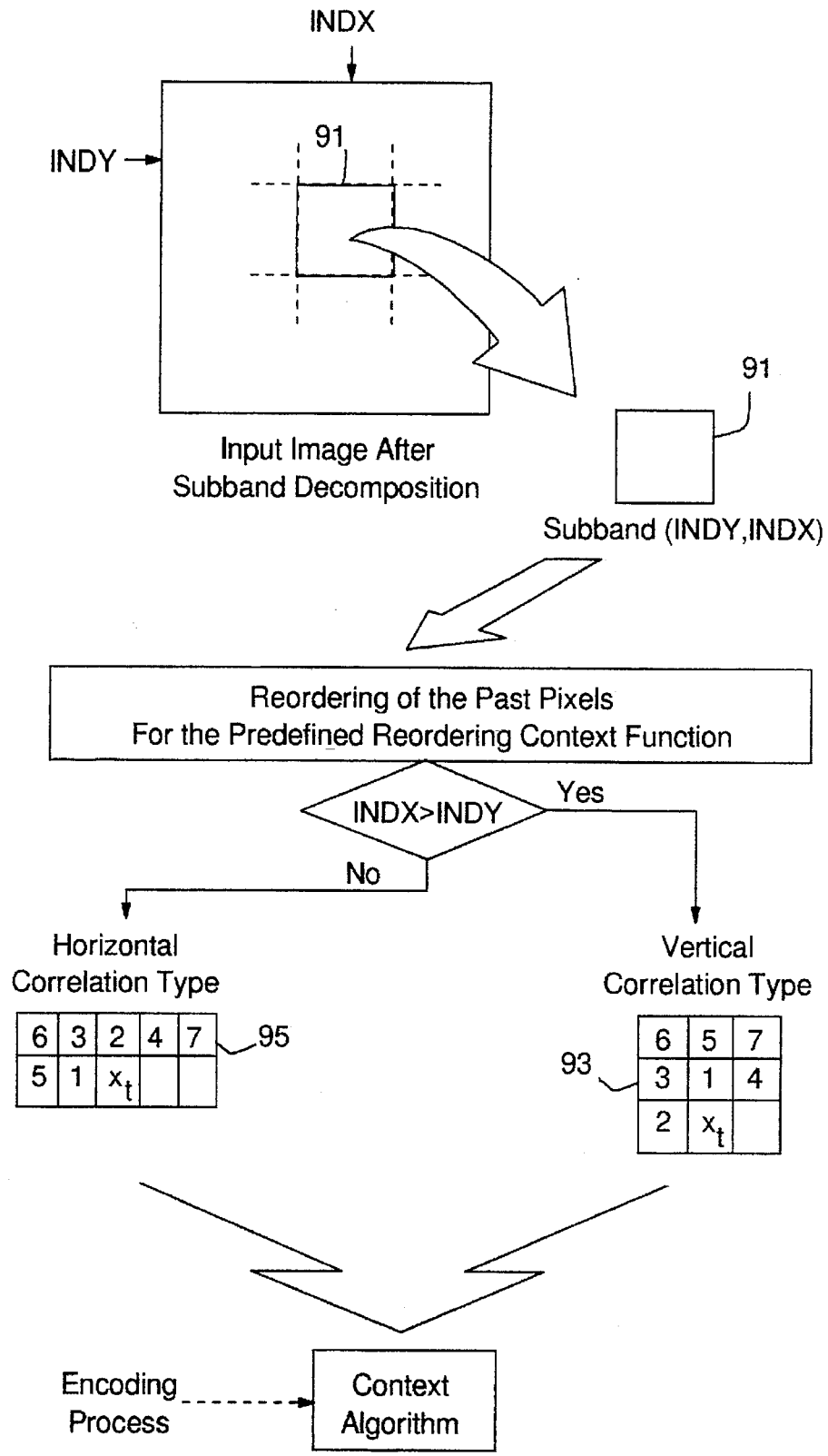
FIG. 9 illustrates a specific parameter involved in this invention.

The coding operations of this invention have now been described. In summary, they include subband filtering each image both vertically and horizontally through a high-pass/low-pass tree filtering structure. While progressing through the tree structure, the signals are properly scaled through predefined level normalizations and shifts. Finally, the resulting subband image (sub-images) signals are encoded/quantized. As already mentioned, any type of subband coding may be used for encoding the subband contents. One may consider, for instance, using DPCM encoding as described in the article published by John W. Woods et al in 1986 IEEE Transactions on ASSP Vol. 34 No. 5, pp. 1278–1288. However, a preferred encoding scheme is based on so-called entropy coding, based or derived from Rissanen's context encoding method. Such a method provides a number of advantages, by enabling proper context adjustment to each subband. For instance, the context function for subband with vertical correlations may be defined differently from the context functions to be assigned to subband presenting horizontal correlations. This is illustrated in FIG. 9. Assume a subband image (step 91) is obtained as subband (INDY, INDX) out of one branch of the tree structured filter. Further assume said image is scanned to get its picture elements (pixels). As mentioned in the above cited references, encoding a current pixel $x_t$ is made dependent upon past scanned pixels; or in other words, said encoding is made context dependent. But said past pixels influence on $x_t$ are not necessarily considered in their initial scanning order (i.e. sequential). They are, instead, considered in a so-called decreasing influence order; i.e., most influential first, then second most influential, ... and so on ... In this application, should INDX>INDY, then the pixels' "influence" on $x_t$ would be as represented in (step 93) for vertical correlation type. Pixel numbered 1 is considered most influential, then pixel numbered 2, then 3, 4, etc. ..., even though their actual location with respect to $x_t$ would be as shown in (step 93), i.e. not according to sequential scanning order. Otherwise, if INDX<INDY, then the pixels' influence (context) would be as represented in (step 95). Both contexts are to be included in the Modelling Unit 12 of U.S. Pat. No. 4,652,856, or in the same Unit as used in the above referenced co-pending application.

Having described the subband processing for coding purposes, one may now describe the decoding leading through entropy decoding, subband recomposition and inverse filtering, to the output image 6 (see FIG. 1).

Entropy decoding shall be based upon conventional techniques (see cited references) and shall enable converting each flow of subband bits (see C(s) in U.S. Pat. No. 4,652,856) back into subband samples or pixels. This application is now directed to recombining said subband samples into the (inverse)-filtering with re-scaling, back to the original image.

Recombining the subbands into output image in the inverse filtering operation first requires so-called re-scaling or re-normalization operations as follows:

for low-pass subbands samples:

$$Lp(i,j) = Lp(i,j) * DNormL + DShiftL \quad (3)$$
for all $i$ and $j$
with : $DNormL = 3$
$DShiftL = -128$ for high-pass subbands:

$$Hp(i,j) = Hp(i,j) * DNormH + DShiftH \quad (4)$$
for all $i$ and $j$
with : $DNormH = 1$
$DShiftH = -128$ Once re-scaled, the low-pass and high-pass components are then computed respectively, according to:

$$\text{Image}(i,j) = \left( \sum_{k=0}^{2} R\,CoefL(k) * Lp(i,j-k) \right) / RNormL \quad (5)$$

wherein:

RNormL=4

RCoefL(0,1,2)=1, 2, 1(Vetterli low-pass reconstruction filter)

and:

$$\text{Image}(i,j) = \left( \sum_{k=0}^{4} R\text{CoefH}(k) * Hp(i,j-k) \right) / R\text{Norm}H \quad (6)$$

wherein:

RNormH=4

RCoefH(0,1, . . . ,4)=1, 2, −6, 2, 1(Vetterli high-pass reconstruction filter)

Figure 10:
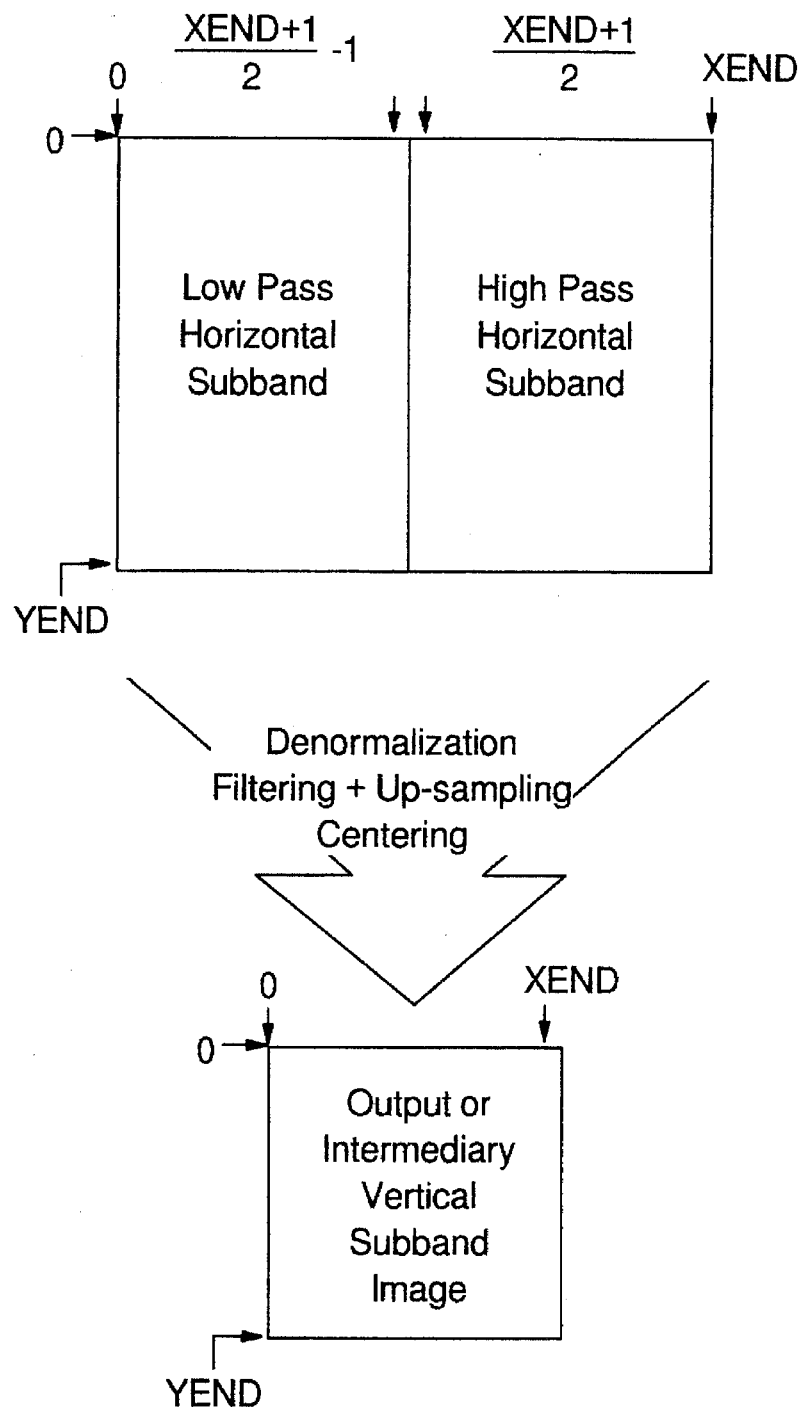
FIGS. 10–13 include flow-charts to illustrate decoding as per the invention.

Represented in FIG. 10 is a schematic illustration of horizontal inverse filtering for recomposition. A low-pass horizontal subband image having column indexes zero to $$(\frac{Xend+1}{2} - 1)$$

and row indexes from zero to Yend is combined with a corresponding high-pass horizontal subband image having column indexes $$\frac{Xend+1}{2} \text{ to Xend}$$

and row indexes zero to Yend, to get successive subband images leading to the recombined output image through the sub-band recombining tree. The operations to be performed include denormalization, (inverse) filtering, up-sampling and centering.

Figure 11A:
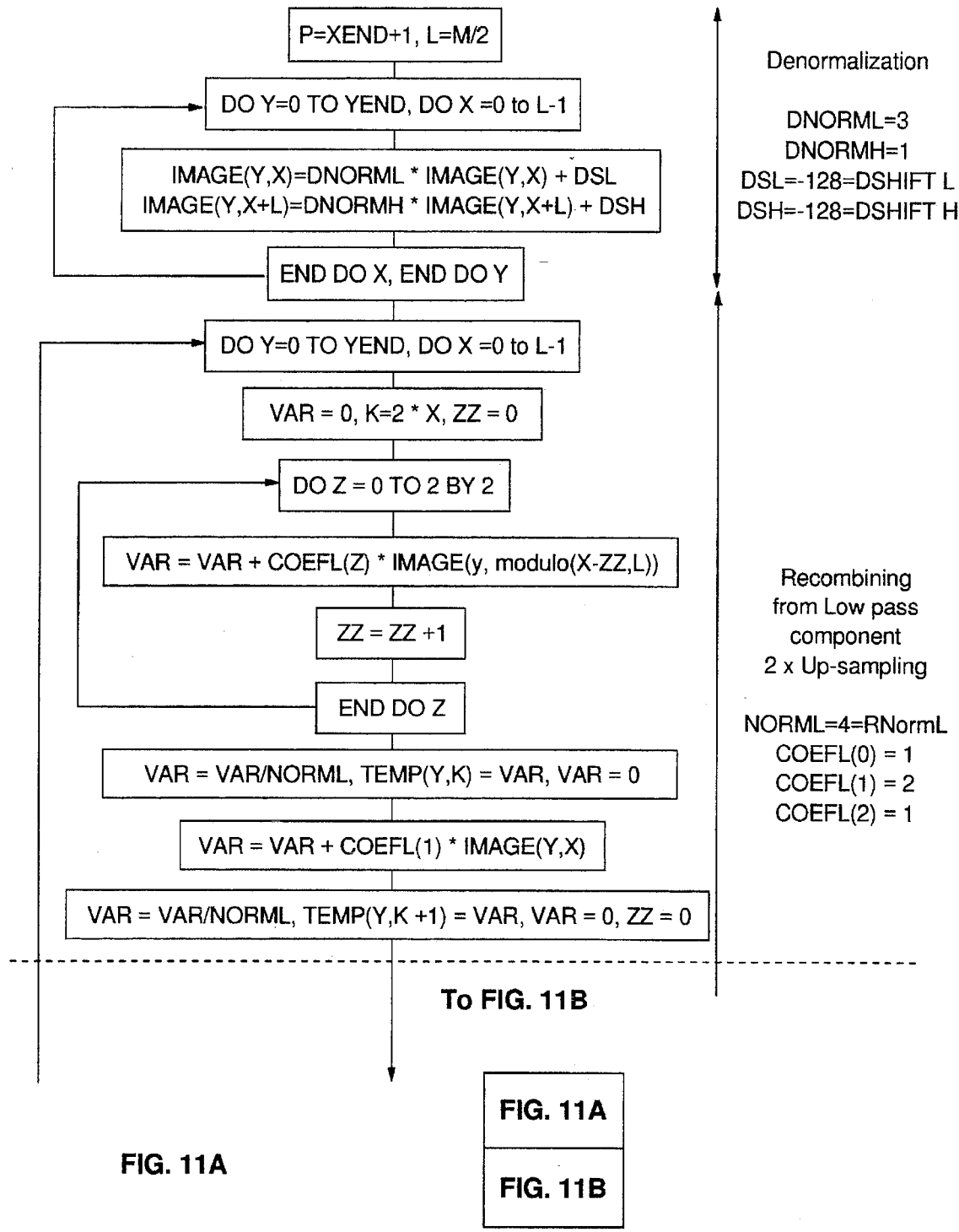
Figures 11A, 11B:
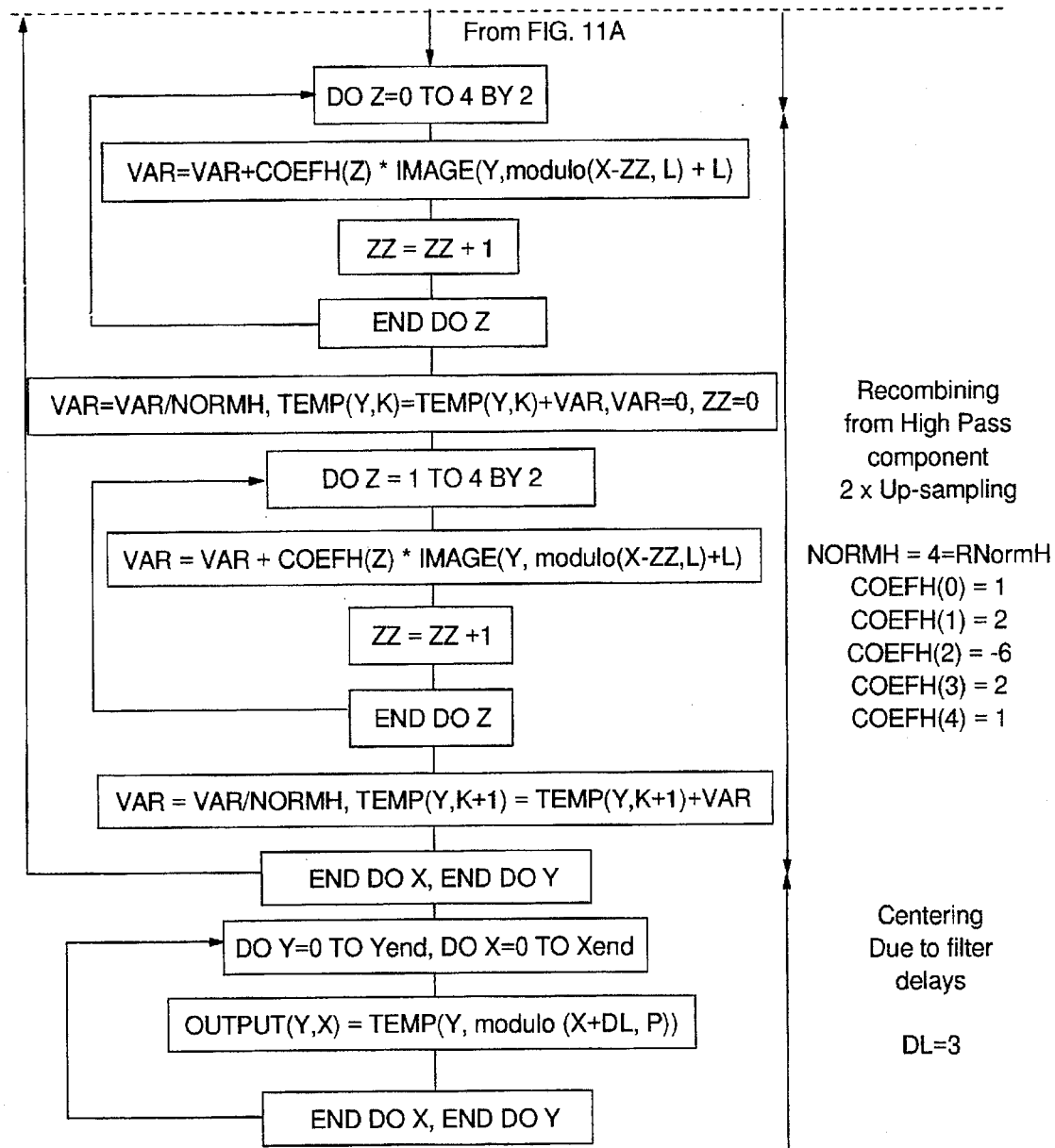

Represented in FIG. 11 (see FIG. 11A+FIG. 11B) is a flowchart, easily implementable through a program and showing the detailed steps of the horizontal recombining process.

Computing parameters P and L are respectively set to (Xend+1) and P/2. Then, denormalizing operations are performed for properly re-scaling the subband image considered.

To that end, the following operations are performed to implement equations (3) and (4) for re-scaling:

$Lp(i,j)=IMAGE(X,Y)=DNORML*IMAGE(X,Y)+DSL$ $Hp(i,j)=IMAGE(X+L,Y)=DNORMH*IMAGE(X+L,Y)+DSH$ for Y varying from zero to Yend
and X varying from zero to L−1
The parameters:
DNORML=3
DNORMH=1
DSH=−128
DSL=−128

Note: it should be noticed that for typing purposes of the flowcharts, we used only capital letters for all parameters. Also, DSL and DSH stand for DShiftL and DShiftH respectively.

Next, inverse filtering and recombining operations are operated from both low-pass and high-pass components (see equations (5), and (6)) together with up-samplings to get the final recombined signal back to its original sampling rate. The operations are performed for Y varying from zero to Yend and X from zero to L−1.

Inverse filtering, which in fact is a filtering per se, for low-pass components includes the following operations:

$VAR=VAR+COEFL(Z)*IMAGE(Y, modulo(X-ZZ, L))$ for Z varying from zero to 2 and VAR, K and ZZ initially set to zero, 2X and zero, respectively.

VAR is re-scaled through a division by NORML=4. This implements equation (5).

Similarly, low-pass components are processed to implement equation (6) through:

$VAR=VAR+COEFH(Z)*IMAGE(Y, modulo(X-ZZ, L)+L).$

Figure 12:
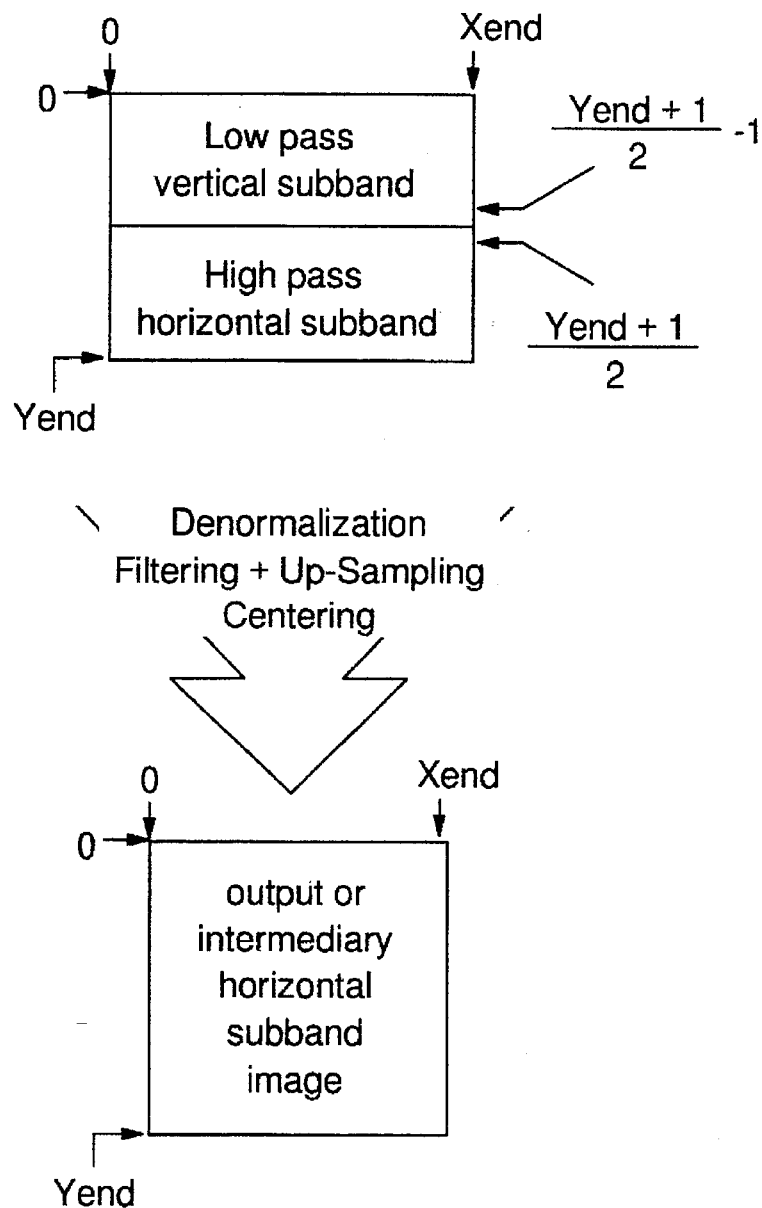

Represented in FIG. 12 is a representation of the vertical (inverse) filtering for recombining subband images. The images to recombine have both row indexes varying from zero to Yend, while column indexes vary from zero to $$\frac{Xend+1}{2} - 1$$

for one and $$\frac{Xend+1}{2} \text{ to Xend}$$

for the other.

Figure 13A:
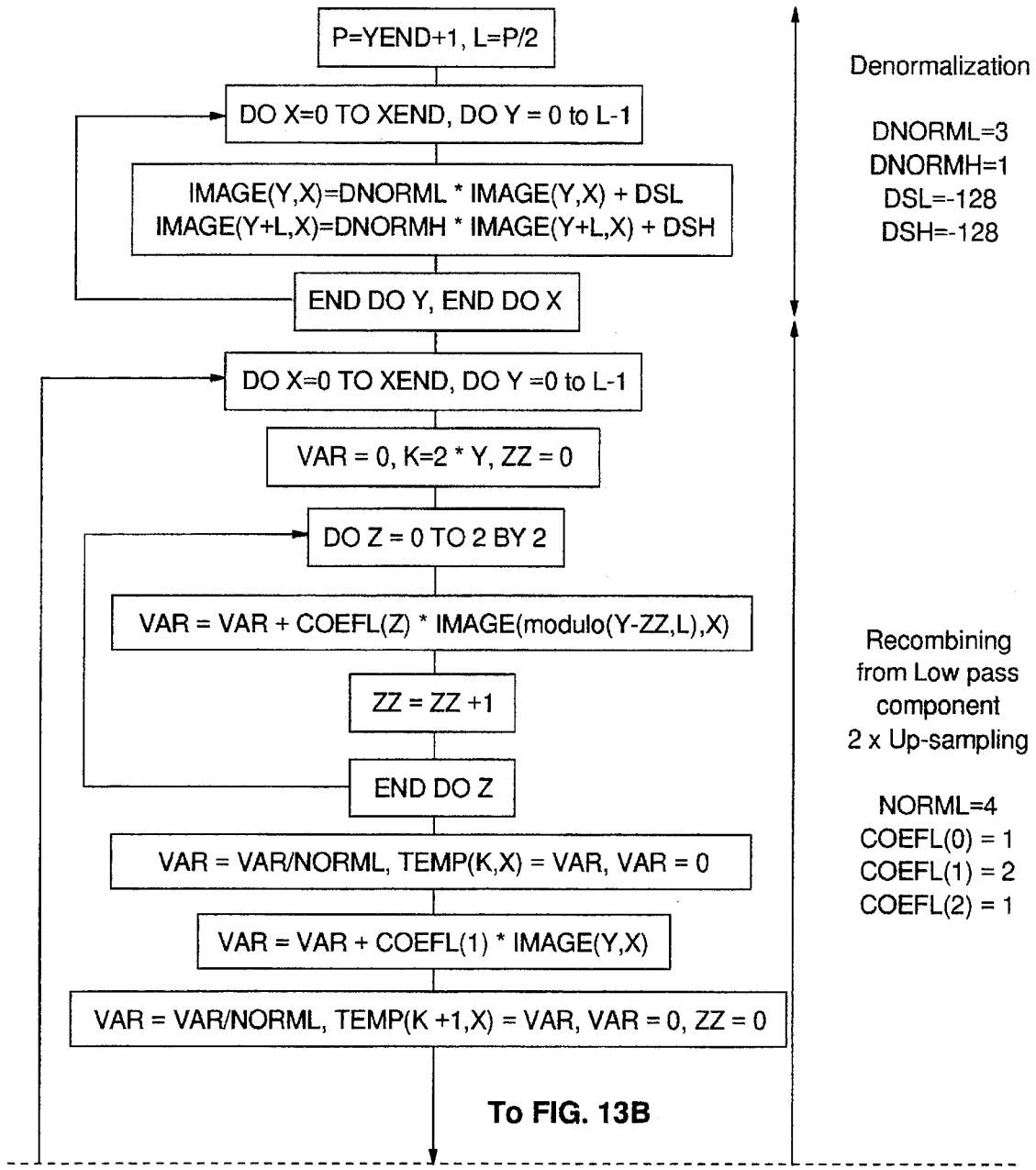
Figure 13B:
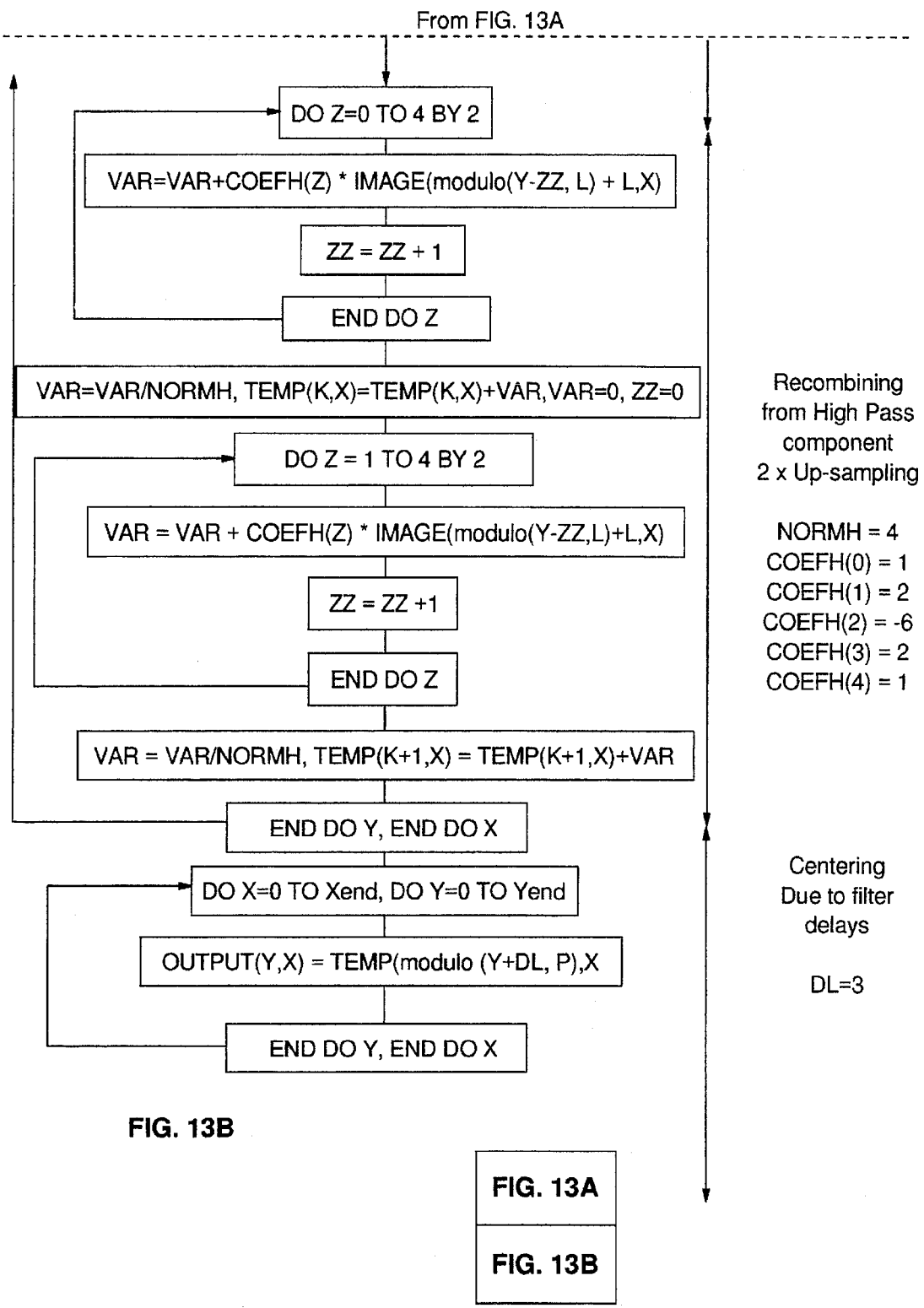

The corresponding flowchart is represented in FIG. 13. Apart from the fact that the variables Y and X are substituted one for the other, both flowcharts 11 and 13 are substantially similar (see FIG. 13A+FIG. 13B).

Finally, repeating the subband recombining through the inverse tree-shaped arrangement as shown in FIG. 1, leads to getting back the full bandwidth original image, or more precisely a synthesized image.

Even though the invention was described as applied to context-type encoding of re-scaled subbands contents, it should be understood that the same principles of subband processing do apply to other encoding schemes. Also, specific context arrangements have been described with reference to FIG. 9. Other contexts including contexts involving pixels from adjacent subbands do apply as well.

We claim:

1. A coding device for coding images using subband coding techniques in an image compression system, said image coding device including:

a tree-shaped filtering means for filtering an image input signal into a plurality of subband image signals, said filtering means including both low-pass filtering means and high-pass filtering means for generating low-pass and high-pass filtered components in each subband respectively;

sub-sampling means for sub-sampling each subband image signal;

means for scaling and normalizing each high-pass and low-pass filtered and sub-sampled subband image signal component to keep the dynamics of said subband image signal component substantially constant throughout each level of the tree-shaped filtering means, said means for scaling and normalizing performing operations according to the following expressions:

$$Lp(i,j) = \left( \left( \sum_{k=0}^{m} \text{CoefL}(k) * \text{Image}(i,j-k) \right) + \text{ShiftL} \right) / \text{NormL}$$

and $$Hp(i,j) = \left( \left( \sum_{K=0}^{n} \text{CoefH}(k) * \text{Image}(i,j-k) \right) + \text{ShiftH} \right) / \text{NormH}$$

wherein:

Lp(i,j) and Hp(i,j) are respectively low-pass and high-pass filtered signal component samples, CoefL and CoefH are respectively predefined low-pass and high-pass filter coefficients, m and n are predefined numbers of filter coefficients, Image(i,j) are image pixels located at coordinates i,j wherein i is the row index and j the column index, ShiftL, ShiftH, NormL and NormH are predefined static scaling factors, derived from the filter coefficients and the original signal swing; and, entropy coding means for coding each subband image using different context definitions based on each subband being encoded.

2. A device in a digital image compression system, for coding a signal obtained by scanning an input image as a two-dimensional array comprising rows and columns of pixels, using subband coding techniques, said device including:

digital filtering means for filtering said input image signal into a plurality of subband image signals using a multi-stage tree-structured filter bank, each stage of said filter bank including both a low-pass filtering means and a high-pass filtering means to generate a low-pass filtered signal component including samples Lp(i,j) and a high-pass filtered signal component including samples Hp(i,j) respectively, said digital filtering means performing operations including shifting and level normalization operations according to:

$$Lp(i,j) = \left( \left( \sum_{k=0}^{m} CoefL(k) * Image(i,j-k) \right) + ShiftL \right) / NormL$$

and $$Hp(i,j) = \left( \left( \sum_{k=0}^{n} CoefH(k) * Image(i,j-k) \right) + ShiftH \right) / NormH$$

wherein:

CoefL and CoefH are respectively predefined low-pass and high-pass filter coefficients, m and n are predefined numbers of filter coefficients, Image(i,j) are image pixels located at coordinates i,j, wherein i is the row index and j the column index, ShiftL, ShiftH, NormL and NormH are predefined static scaling factors, derived from the filter coefficients and the original signal swing, whereby each subband image signal is being scaled at each stage within the filter bank, to keep the dynamic of each subband image signal substantially constant throughout said filter bank; and, digital encoding means for encoding each subband image signal separately.

3. The coding device according to claim 2 including sub-sampling means for performing sub-sampling operations on the subband signals to keep the overall sampling rate even throughout the tree-structured filter bank.

4. The coding device according to claim 3, wherein said digital encoding means include means for encoding the individual subband signals using entropy coding techniques.

5. The device of claim 4 wherein said entropy coding means include means for performing context coding of each subband image signal, said context coding involving pixels from adjacent subbands.

* * * * *